(12) United States Patent
Cattaneo

(10) Patent No.: US 12,012,983 B2
(45) Date of Patent: Jun. 18, 2024

(54) ACTUATION AND BLOCKING SYSTEM OF A JOINT BETWEEN A SHOULDER AND A SHELF OF FURNITURE OR OTHER FURNISHING ITEMS

(71) Applicant: Leonardo S.r.l., Figino Serenza (IT)

(72) Inventor: Carlo Cattaneo, Figino Serenza (IT)

( * ) Notice: Subject to any disclaimer, the term of this patent is extended or adjusted under 35 U.S.C. 154(b) by 594 days.

(21) Appl. No.: 17/253,882

(22) PCT Filed: Jul. 8, 2019

(86) PCT No.: PCT/IB2019/055786
§ 371 (c)(1),
(2) Date: Dec. 18, 2020

(87) PCT Pub. No.: WO2020/012320
PCT Pub. Date: Jan. 16, 2020

(65) Prior Publication Data
US 2021/0270303 A1    Sep. 2, 2021

(30) Foreign Application Priority Data
Jul. 12, 2018  (IT) .................. 102018000007127

(51) Int. Cl.
*F16B 12/20*    (2006.01)
(52) U.S. Cl.
CPC ...... *F16B 12/2063* (2013.01); *F16B 12/2009* (2013.01)
(58) Field of Classification Search
CPC .. F16B 12/14; F16B 12/2009; F16B 12/2036; F16B 12/2063; F16B 2012/106; F16B 2012/145; F16B 2012/2018; F16B 5/0024; F16B 2005/0678; F16B 35/005; A47B 95/008
See application file for complete search history.

(56) References Cited

U.S. PATENT DOCUMENTS 5,743,670 A     4/1998  Ader
8,448,535 B2 *  5/2013  Wang ................. B25B 23/0028
                                                30/500
(Continued)

FOREIGN PATENT DOCUMENTS

DE   2624273 A1 * 12/1977
EP   1698253 A1 *  9/2006
NO   2018007315      1/2018
(Continued)

*Primary Examiner* — Matthew R McMahon
(74) *Attorney, Agent, or Firm* — Themis Law

(57) ABSTRACT

An actuation and blocking system of a joint for use in a piece of furniture or other furnishing item for perpendicularly interconnecting a shoulder with a shelf, base or top includes a pin with a fixing element to the shoulder and the shelf, base or top and adapted to be at least partially inserted in a hole of the shoulder and of the shelf, base or top. The pin has a side hole for receiving a shaped stem, which extends from an actuation and blocking group of the joint positioned on the shelf, base or top parallel to the floor or the ceiling, which are close to the furniture or other furnishing item when assembled, the actuation and blocking group providing for a 90° transmission between a maneuvering point, accessible from the front or side of the furniture, and the shaped stem, inserted in the side hole of the pin.

4 Claims, 11 Drawing Sheets

(56) References Cited

U.S. PATENT DOCUMENTS 10,865,821 B2 * 12/2020 Cattaneo ............. F16B 12/2063
2018/0310707 A1 * 11/2018 Berloni .................. F16B 12/10

FOREIGN PATENT DOCUMENTS

| WO | WO-2005115199 A1 * | 12/2005 |
| WO | 2008076089 | 6/2008 |
| WO | WO-2009056935 A1 * | 5/2009 |
| WO | WO-2017060298 A1 * | 4/2017 |

* cited by examiner

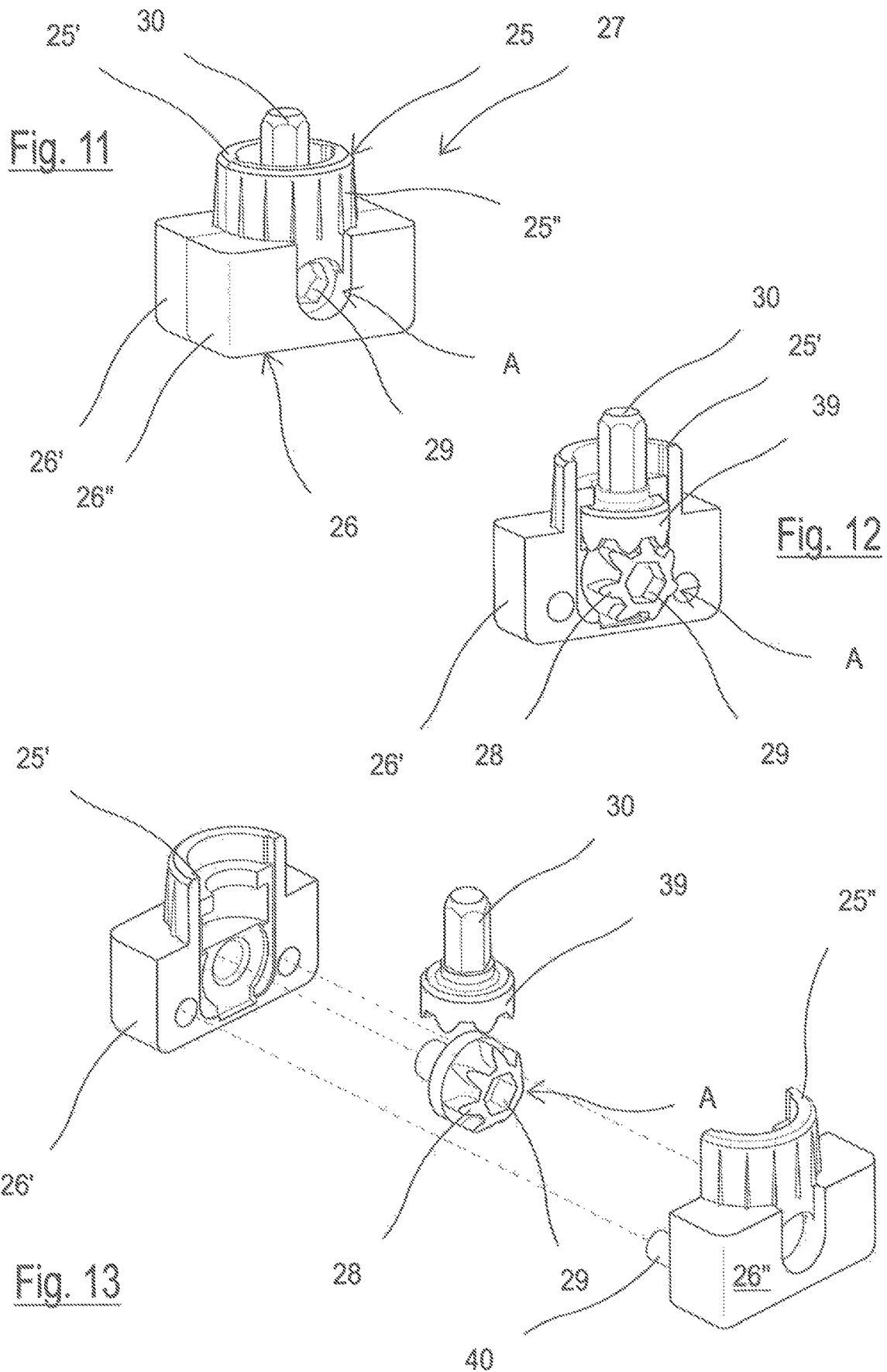

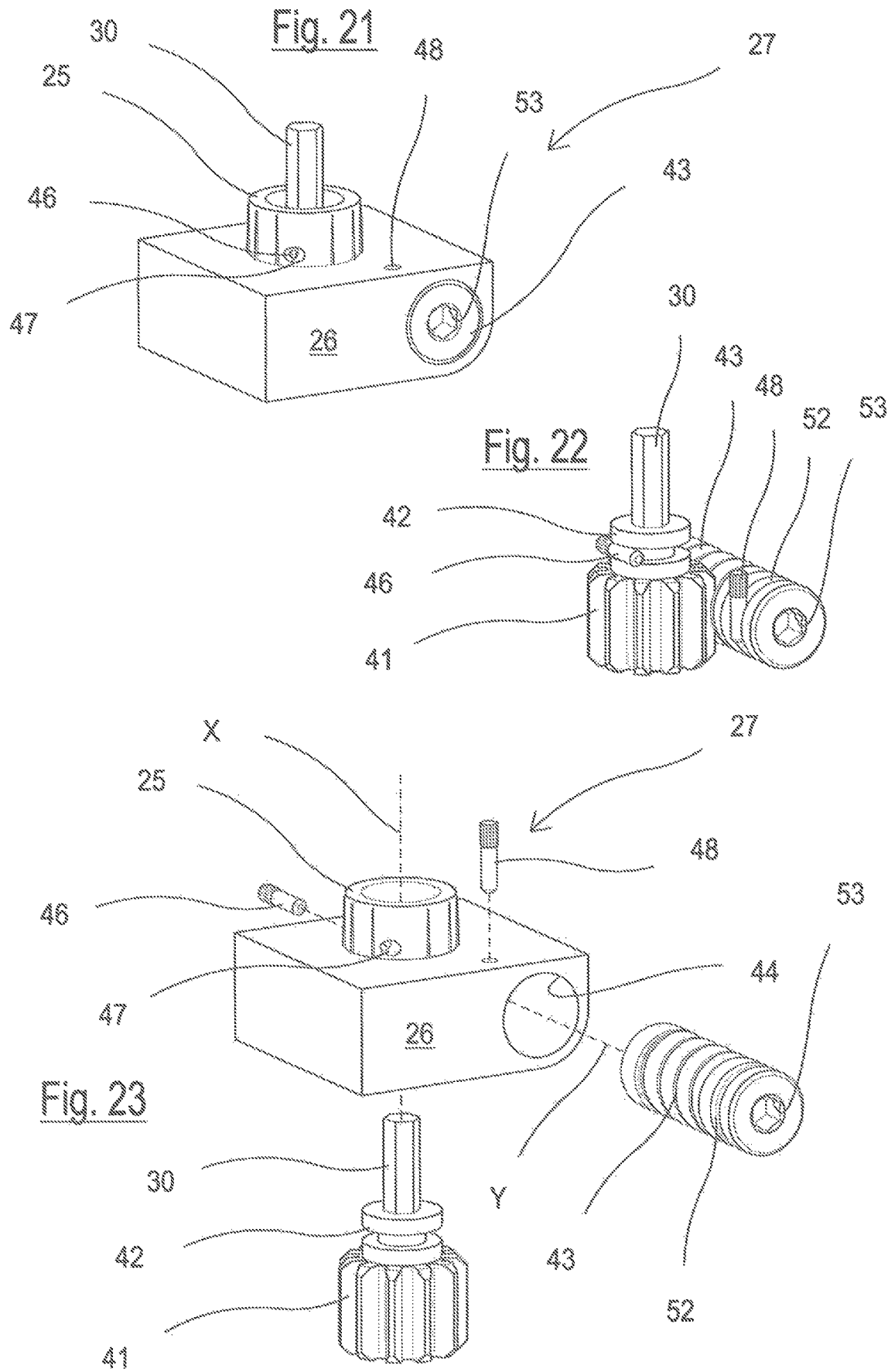

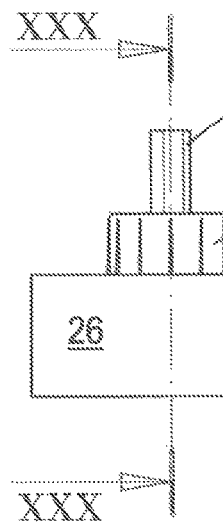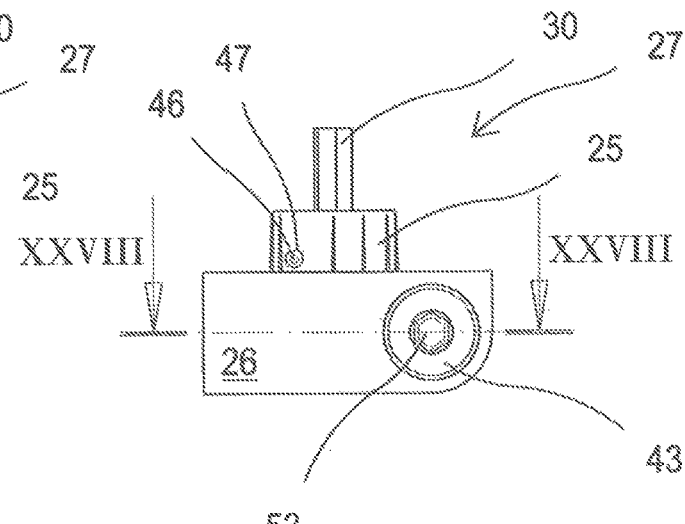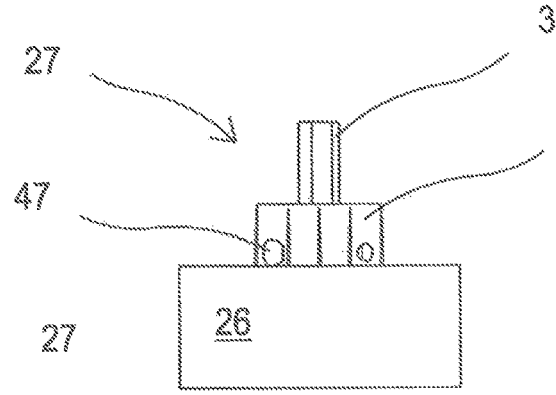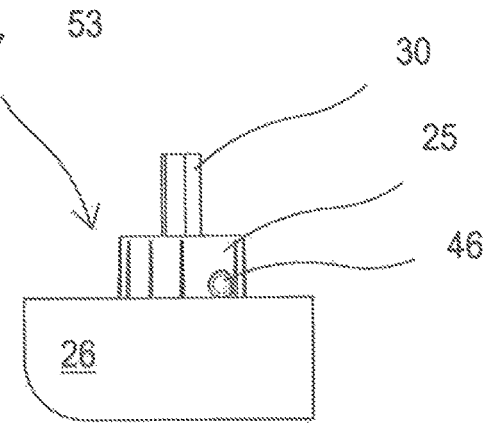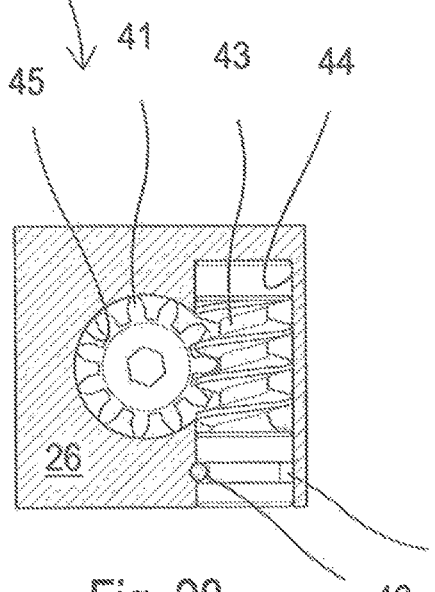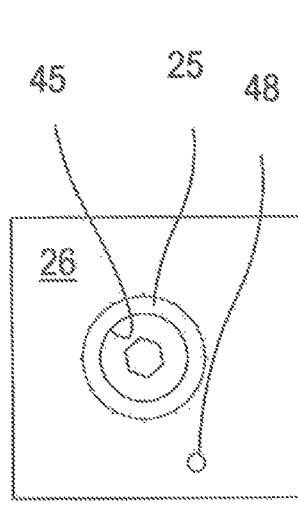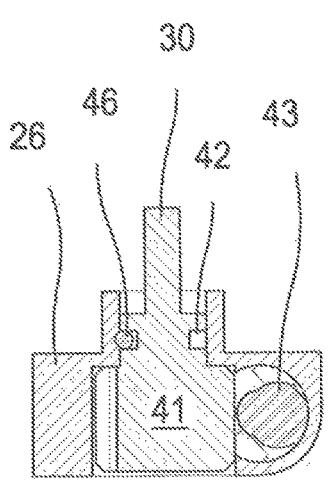

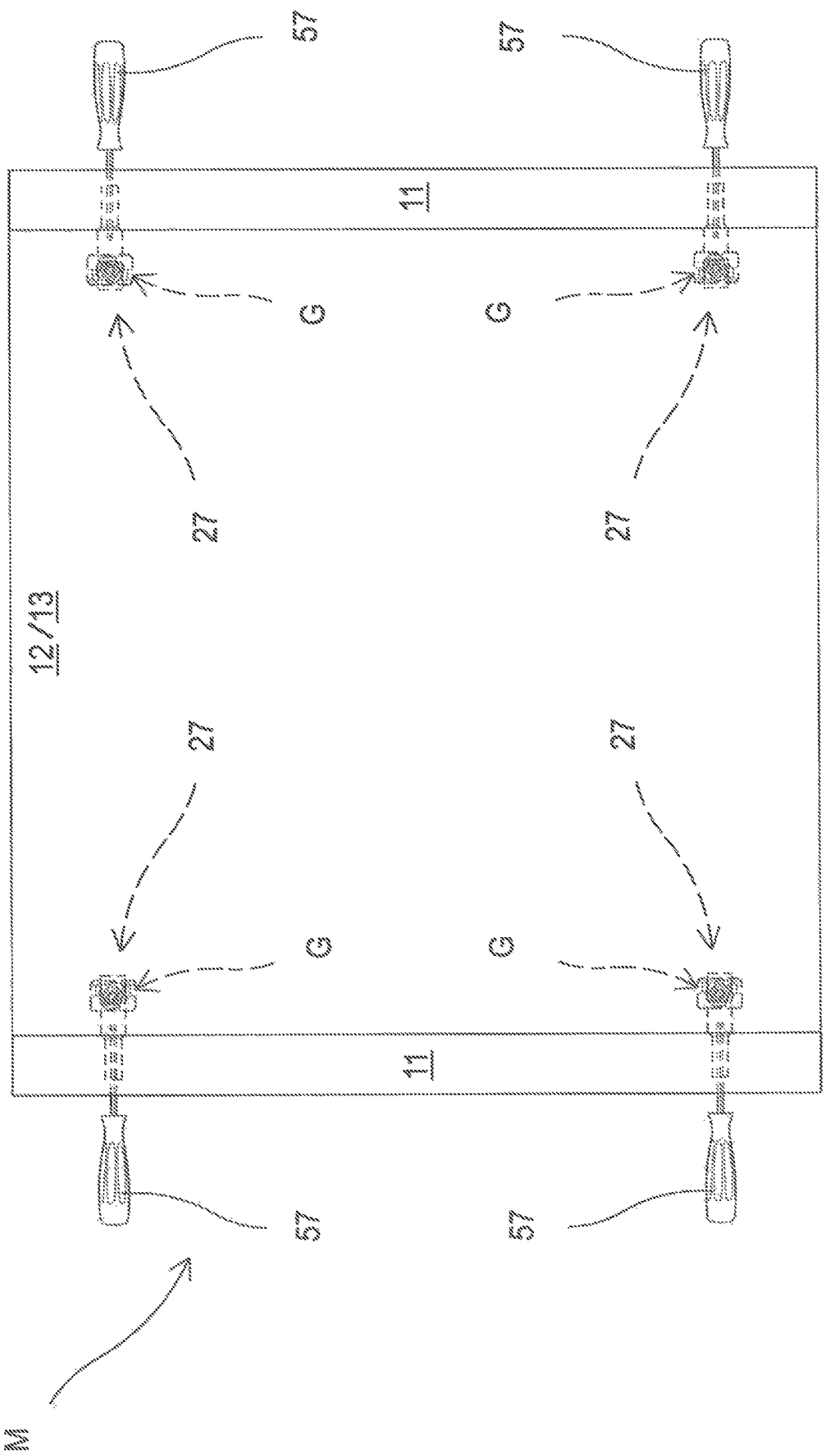

ACTUATION AND BLOCKING SYSTEM OF A JOINT BETWEEN A SHOULDER AND A SHELF OF FURNITURE OR OTHER FURNISHING ITEMS

The present invention relates to a system for actuating and blocking a joint between a shoulder and a shelf of furniture or other furnishing items.

Various types of blocking systems are known between panels of furniture and other furnishing items, for example, in particular between a shoulder and a shelf. In this description, the generic term "shelf" refers to a base, a top or any intermediate shelf of a piece of furniture.

The actuation of joints is effected in numerous ways and with a wide variety of devices, well known to skilled persons in the field. In general, however, a connection group and a blocking group are provided which, by interacting with each other, ensure a stable positioning between the parts. The actuation of these groups takes place between the parts of the furniture itself, from below, from above, etc. depending on the specific requests and requirements.

Both the final aesthetic aspects of the furniture or the like when assembled, and also the aspects relating to the assembly of the parts are, in fact, important.

In some of these applications, the parts of the furniture or furnishing item can be positioned in extremely narrow spaces both in height and in width with difficulty for the joining operations between the shoulders and shelves.

The general objective of the present invention is therefore to provide a system for actuating and blocking a joint between a shoulder and a shelf of furniture or other furnishing items which is capable of solving the above-mentioned drawbacks of the known art in a simple, economical and functional manner.

A further objective of the present invention is to provide a joining system between two panels which also has a minimum encumbrance and minimum visibility by an observer, although being easily accessible from extremely minimal spaces between the floor and piece of furniture or furnishing item or between the top and the ceiling.

Another objective of the present invention is to provide a joining system which can be used between both shoulder and base or shelf, and also between shoulder and top.

The above objectives are achieved by a system for actuating and blocking a joint between a shoulder and a shelf of furniture or other furnishing items produced according to independent claim 1 and the following subordinate claims.

The structural and functional characteristics of the present invention and its advantages with respect to the known art will appear even more evident from the following description, referring to the attached schematic drawings, which show embodiment examples of the same invention all having the same innovative concept. In the drawings:

FIGS. 11 to 20 are perspective views, sectional, side views, plan views, partially sectional and of sectional details showing in detail an embodiment of an actuation and blocking group of a joint forming part of the system of the present invention with a body in two half-shells and with a pinion-toothed crown bevel gear;

FIGS. 21 to 30 are perspective views, sectional, side views, plan views, partially sectional and of sectional details showing in detail an embodiment of an actuation and blocking group of a joint forming part of the system of the present invention with a worm screw and gearwheel;

FIG. 31 is a schematic plan view of a further different arrangement of an actuation system according to the invention between shoulders and a shelf.

Figure 1:
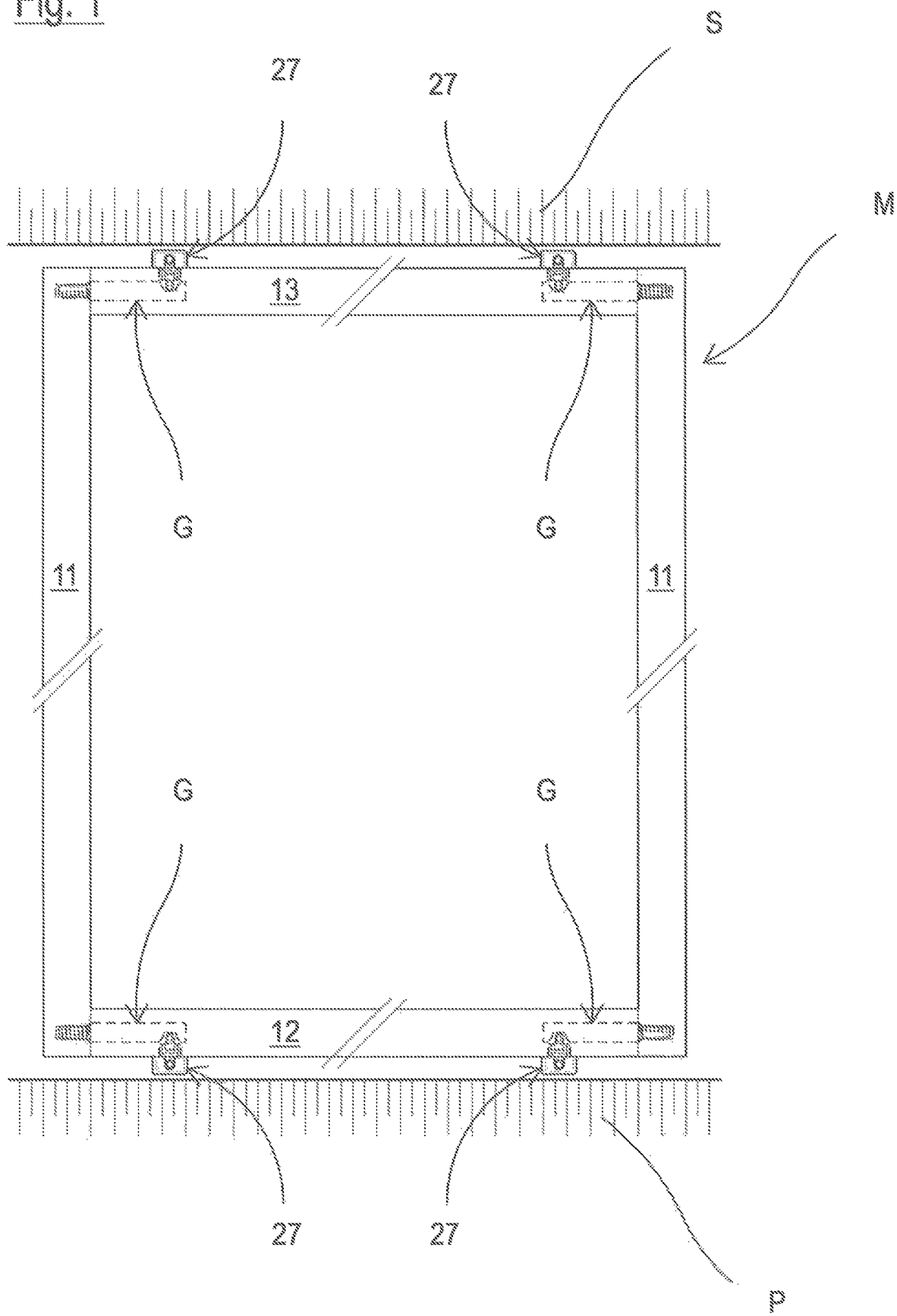
FIG. 1 is a schematic front view of an actuation and blocking system of a joint between shoulders and a base and a top for furniture or other furnishing items produced according to the invention.
Figure 2:
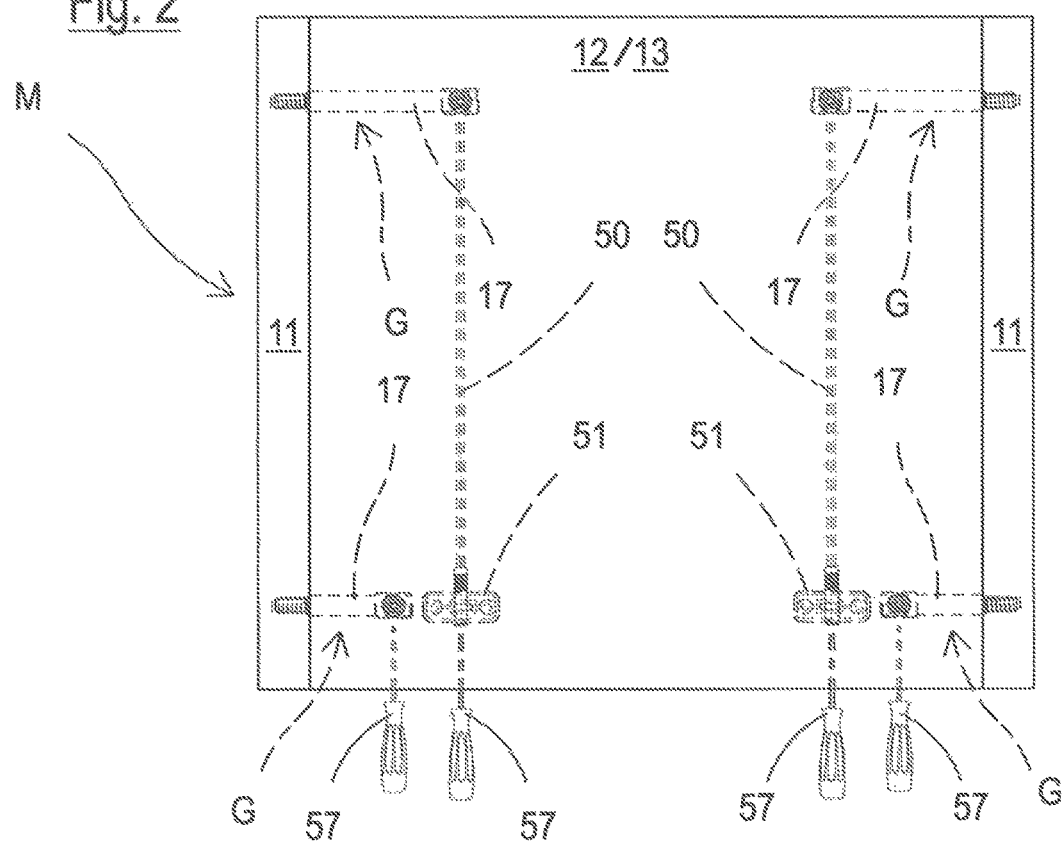
FIGS. 2 and 3 are schematic plan views of two different arrangements of actuation systems according to the invention between shoulders and a shelf.
Figure 3:
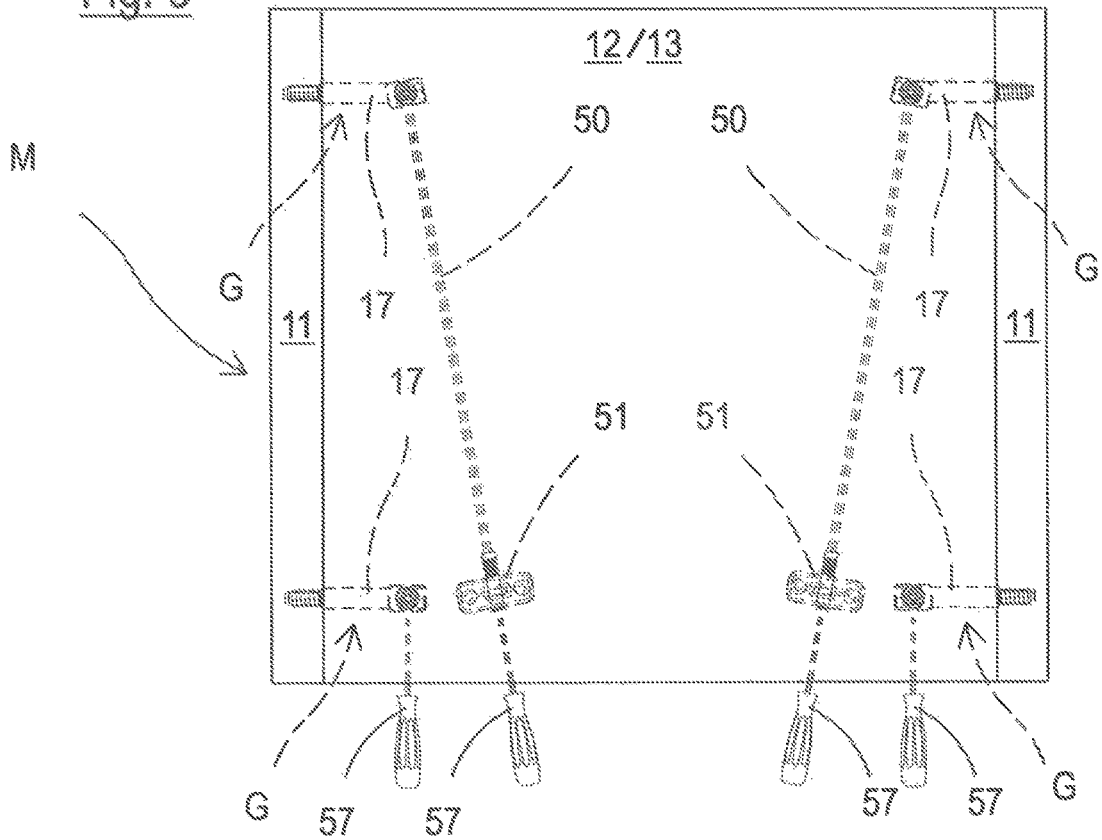

With reference in general to FIGS. 1 to 3, these show actuation and blocking systems of a joint G between shoulders 11 and a base 12 and a top 13 of furniture or other furnishing items produced according to the invention.

FIG. 1 shows how a piece of furniture M, shown in its shoulders 11 as well as in a base 12 and a top 13, is housed between a floor P and a ceiling S very close to the furniture M when assembled.

The base 12 and the top 13, and any other intermediate shelf (not shown in FIG. 1) are made stably integral with each other thanks to a series of joints G connected to actuation and blocking groups 27 of the single joint forming a system according to the invention.

Figure 4:
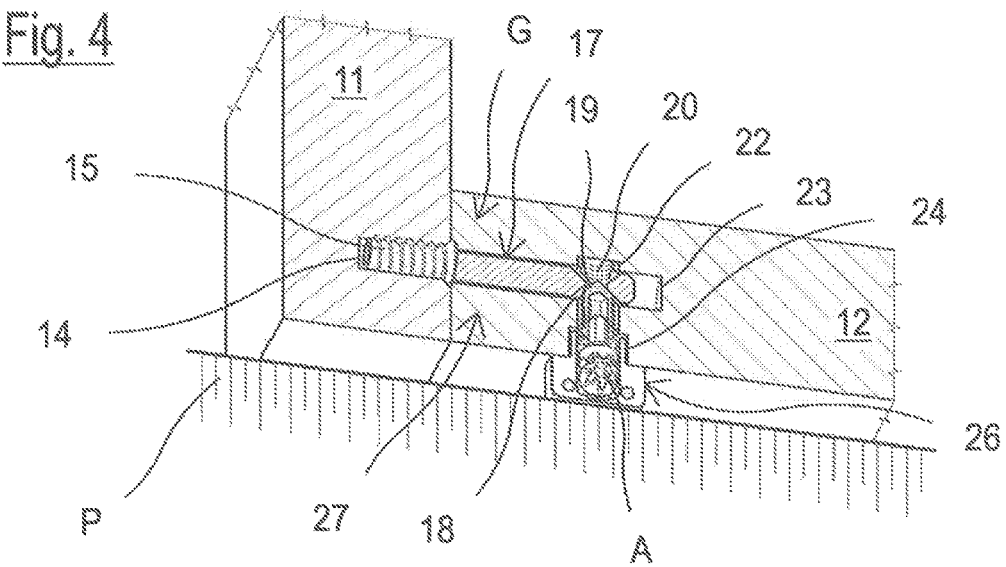
FIGS. 4, 4a, 5 and 6 are an exploded perspective view, partially sectional, an enlarged detail and two raised sectional front views of a first embodiment of an actuation and blocking system of a joint between a shoulder and a shelf, exploded, in two different positions.

FIG. 4 for example shows a shoulder 11 and a shelf in the form of a base 12 such as those shown in FIG. 1, once made integral with each other thanks to an embodiment of the actuation and blocking system of the joint of the present invention.

The shoulder 11 has a horizontal blind hole 14 which defines a seat in which an internally threaded bush 15 is positioned to receive a threaded end 16 of a pin 17. Alternatively, the threaded end 16 of the pin 17 is screwed directly into the blind hole 14.

The pin 17 in its protruding part provides a housing 18 for a tip of a blocking grub screw 19.

In the example, the blocking grub screw 19 is screwed into an inner threaded hole 20 of a barrel 21. The barrel 21 is arranged in a first hole 22 of the shelf or base 12. In particular, this first hole 22 crosses with, and intersects a second hole 23 formed in a direction perpendicular to the first hole 22 of the shelf.

This second hole 23 is formed to receive the part of the pin 17 projecting from the shoulder 11, once aligned with the same. It can therefore be noted that the pin 17 is inserted through its parts at least partially in the hole 14 of the shoulder 11 and in the hole 23 of the shelf or base 12 or top 13.

The first hole 22, in its end part facing the lower surface of the shelf or base facing the floor P, has a portion with an enlarged diameter 24.

In this portion with an enlarged diameter 24 of the hole 22, there is a pressure arrangement and an extension 25 is housed, of a shaped body 26 of an actuation and blocking group 27 of the joint G forming part of the system of the present invention.

Figure 5:
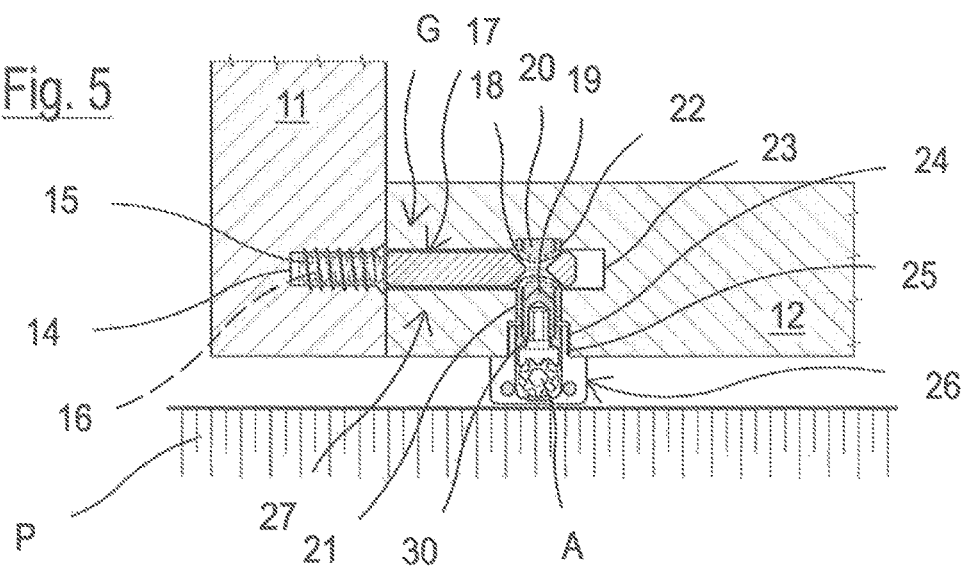
Figure 6:
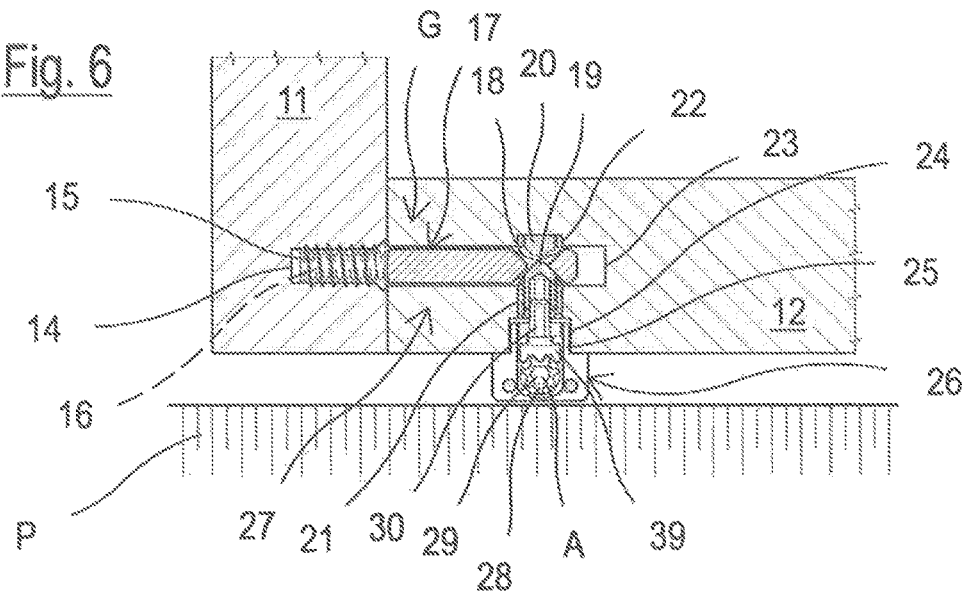
Figure 4A:
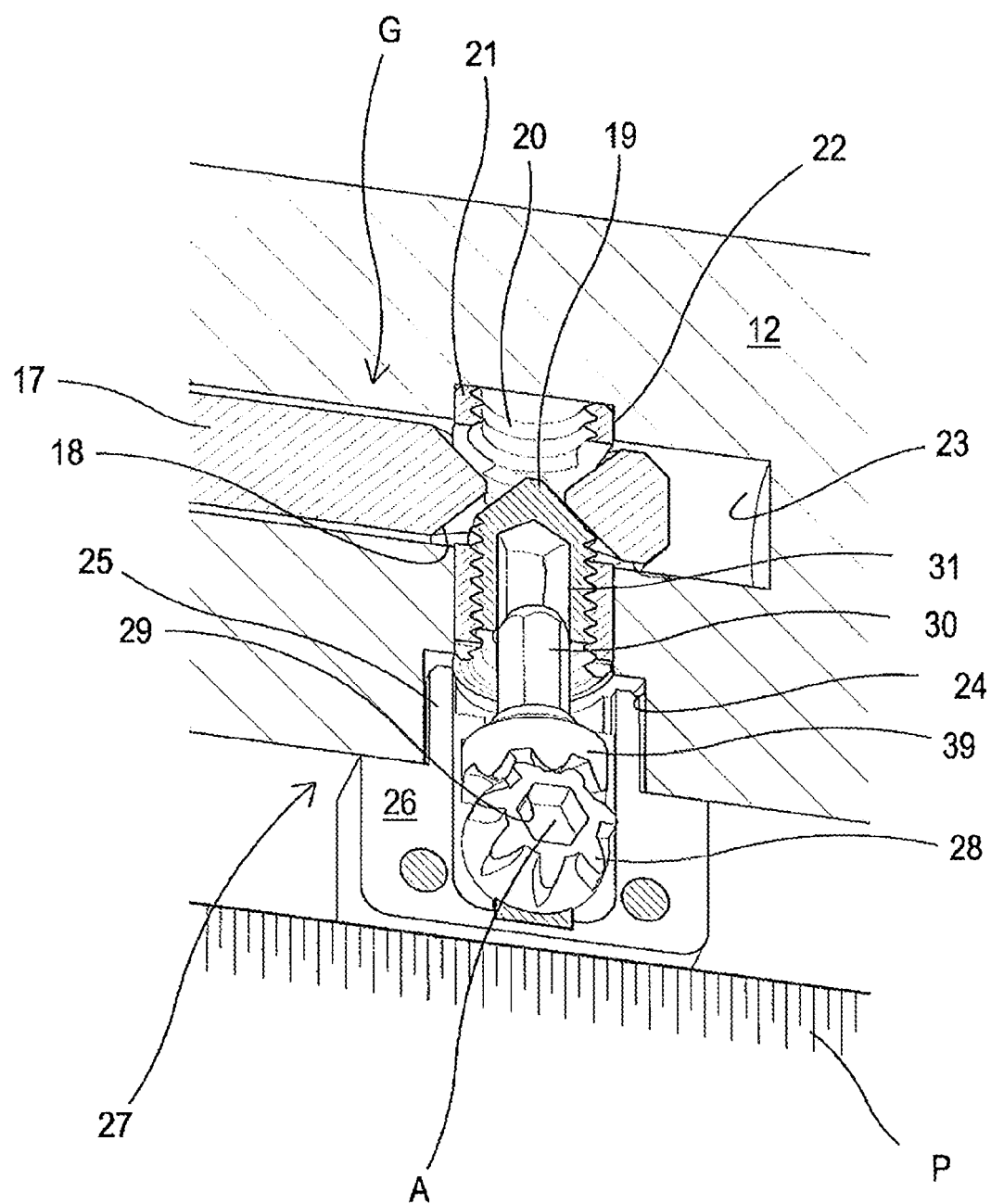

The shaped body 26 of the actuation and blocking group 27 of the joint G is arranged below the shelf, or base 12 facing downwards (in the example of FIGS. 4-6), or identically above the top 13 upwards. As can be seen, the shelf or base, 12 or top 13 is parallel to the floor P or to the ceiling S, where both the floor P or the ceiling S are close to the piece of furniture or other furnishing item M when assembled, as clearly shown in FIG. 1.

The actuation and blocking group 27 of the joint G provides a 90° transmission between a maneuvering or actuation point, indicated by A, accessible from the front or front and/or side with respect to the furniture. The actuation and blocking group 27 of the joint G provides a shaped stem 30 which is inserted in a hole 31 formed inside the blocking grub screw 19.

For this purpose, the shaped body 26 contains a pinion-toothed crown bevel gear. A pinion 28 is in fact rotatably positioned within the shaped body 26 and said pinion provides a seat 29 in the actuation point A facing the front part of the furniture M. The pinion 28 engages with a toothed crown 39, formed as the head of the shaped stem 30 which extends towards the outside of the group to be inserted in the hole 31 of the blocking grub screw 19 in this example. In general, said stem 30 is engaged inside an element of the joint G.

Figure 7:
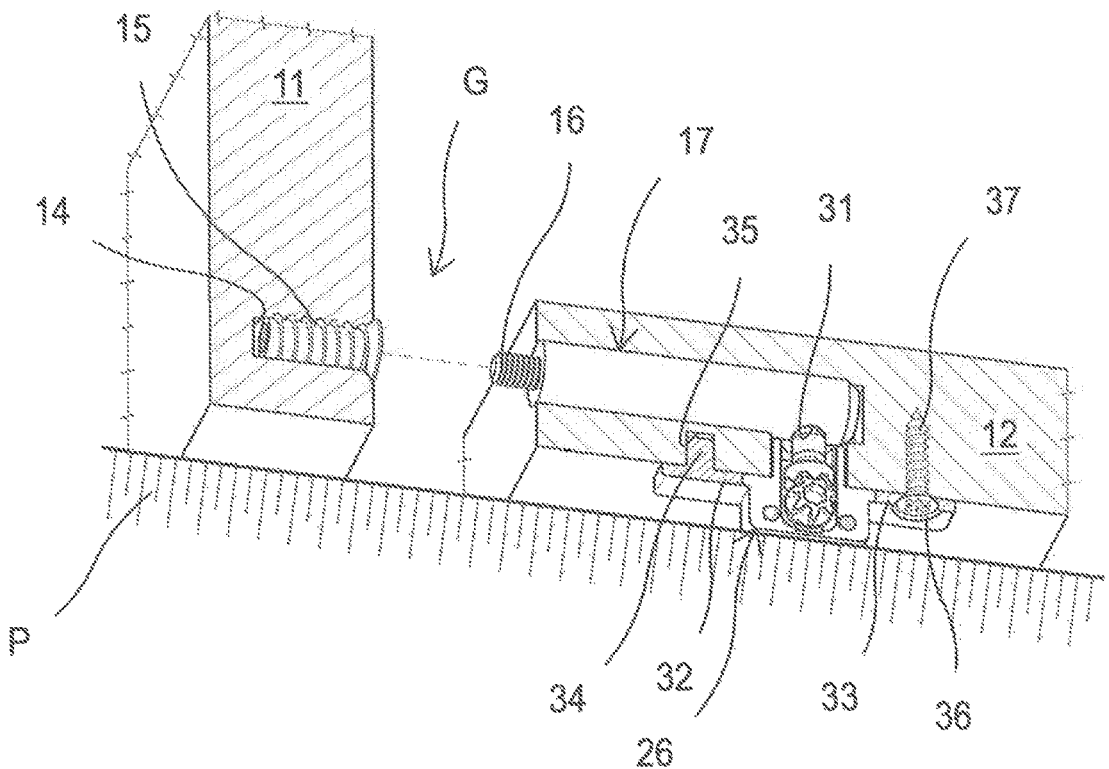
FIGS. 7 and 8 are a perspective view, partially sectional, and a raised sectional front view of a second embodiment of an actuation and blocking system of a joint between a shoulder and a shelf, exploded.
Figure 8:
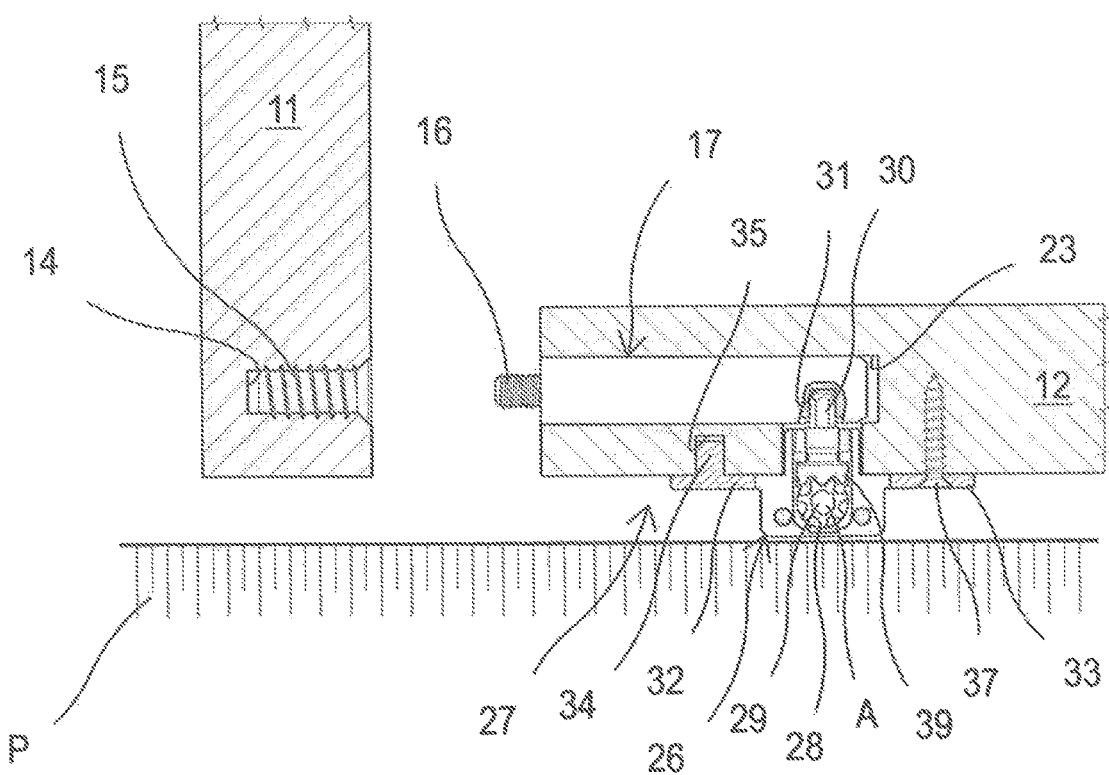

FIGS. 7 and 8 show a second embodiment of an actuation and blocking system of a joint G between a shoulder 11 and a shelf or base 12, or top 13 of a piece of furniture M.

In this example, the same reference numbers are used for the same elements.

The shoulder 11 has the horizontal blind hole 14 in which the internally threaded bush 15 is positioned, suitable for receiving a threaded end 16 of a pin 17.

In this embodiment, the pin 17 is composed of a casing which contains in its interior an actuation mechanism for rotating a threaded end 16 suitable for being screwed into said bush 15. The pin 17 in its outer casing comprises a side hole 31 suitable for receiving a shaped stem 30 bearing at one of its ends facing downwards, a toothed crown 39, formed as a head of the shaped stem 30. Said stem 30 extends from a shaped body 26 positioned below the shelf or base or top 12.

All of this forms part of an actuation and blocking group 27 of the joint G arranged in association with the base 12 in this example. Also in this case, therefore, the actuation and blocking group 27 of the joint G provides a 90° transmission between a maneuvering or actuation point, indicated by A, accessible from the front of the furniture.

The shaped body 26 contains a pinion-toothed crown bevel gear. A pinion 28 is in fact rotatably positioned within the shaped body 26 and provides an actuation seat 29 facing the front of the furniture M. The pinion 28 engages with the above-mentioned toothed crown 39, formed as the head of the shaped stem 30.

In this example, the shaped body 26 extends beneath the lower surface of the shelf or base facing the floor P through appendages 32, 33. A first appendage 32 is provided with a reference plug 34 inserted centered in a blind hole 35 of the shelf or base or top 12. A second appendage 33 has a hole 36 in which a screw 37 is inserted, which creates the stable fixing of the shaped body 26 below the shelf or base 12 or top 13.

For the actuation and blocking group 27 of the joint G of this example, there is therefore a provision for positioning a reference plug 34 and a fixing screw 37 beneath the shelf or base 12 or cap 13 which create a secure positioning.

A tool 57, for example of the type with a hexagonal tip, when inserted in the actuation seat 29, for example also of the hexagonal type, of the pinion 28 and rotated, controls the rotation of the toothed crown 39 integral with the shaped stem 30 with the consequent activation of the actuation mechanism for the rotation of the threaded end 16 which is screwed into the bush 15 arranged in the hole 14 of the shoulder 11.

Previously, the threaded end 16 was brought closer to the bush 15 so that the threaded end 16, when rotated, could be screwed into the bush. This rotation is continued until the base 12 is brought into contact with the shoulder 11.

Figure 9:
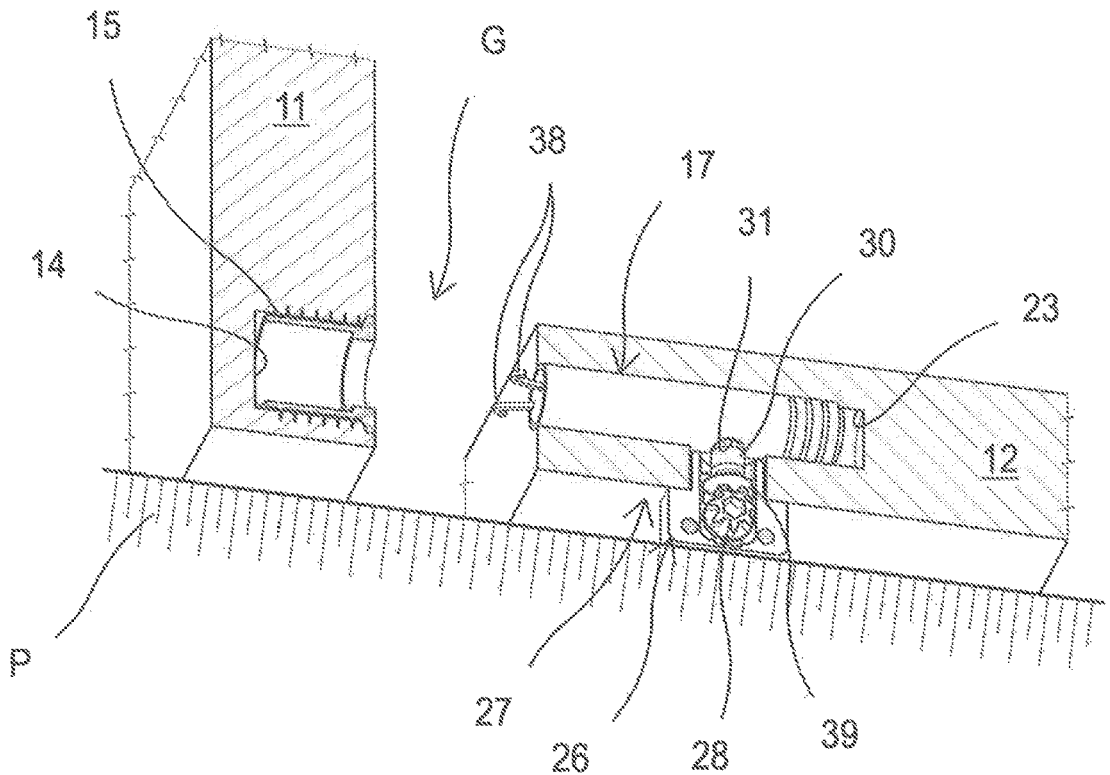
FIGS. 9 and 10 are a perspective view, partially sectional, and a raised sectional front view of a third embodiment of an actuation and blocking system of a joint between a shoulder and a shelf, exploded.
Figure 10:
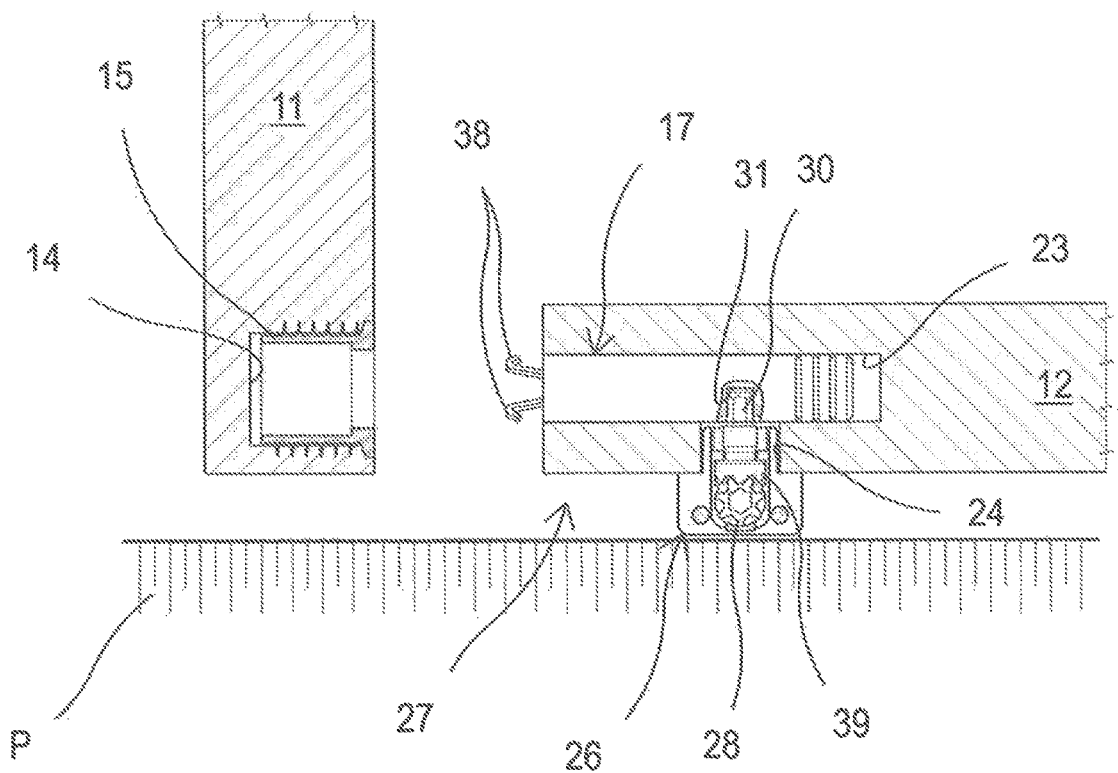
Figure 14:
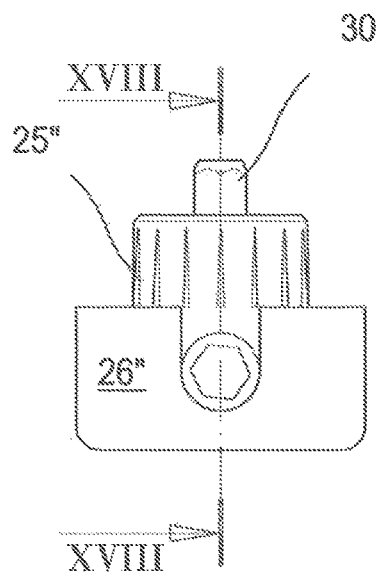
Figure 15:
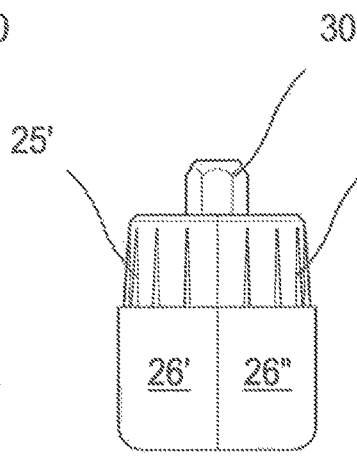
Figure 16:
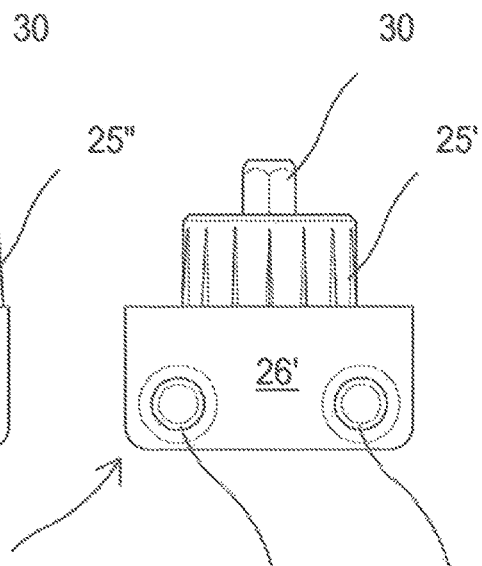
Figure 17:
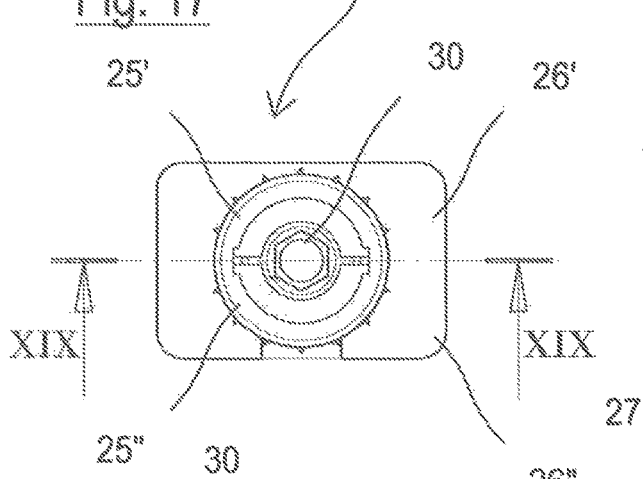
Figure 18:
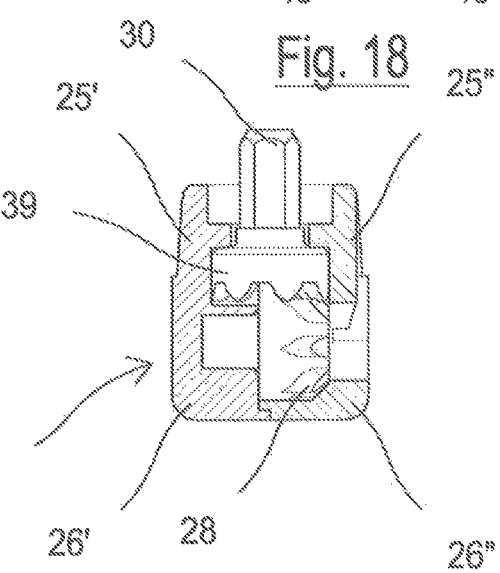
Figure 19:
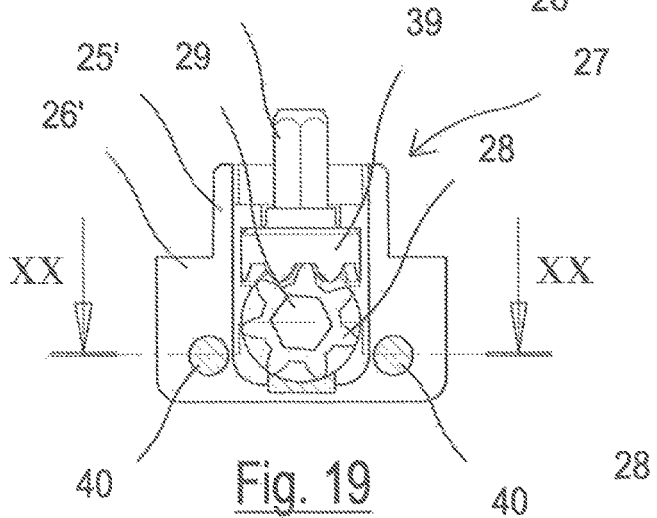
Figure 20:
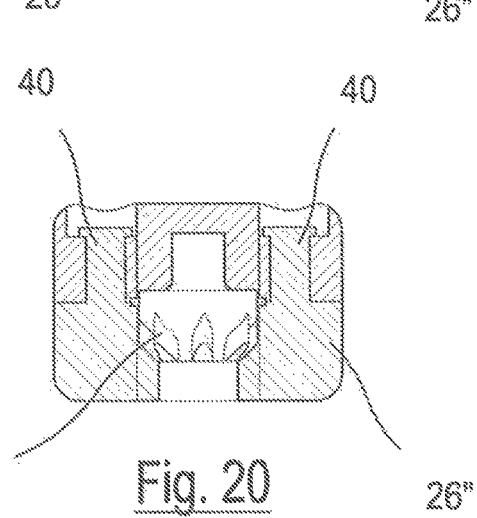

FIGS. 9 and 10 show a third embodiment of an actuation and blocking system of a joint between a shoulder 11 and a shelf 12, or base or top of a piece of furniture M.

Also in this further example, the same reference numbers are used for the same elements.

The shoulder 11 has a horizontal blind hole 14 in which a bush 15 is screw-positioned.

In this further embodiment, the pin 17 is composed of a casing which contains in its interior an actuation mechanism for expandable gripping means 38, in the form of hooks, for example, which are arranged, when expanded, inside the bush 15 of the hole 14 of the shoulder 11 to be anchored therein.

The pin 17, in its outer casing, also in this case provides a side hole 31 suitable for receiving a shaped stem 30 bearing at one of its ends, a toothed crown 39, formed as the head of the shaped stem 30. The shaped stem 30 thus engaged causes the activation of the actuation mechanism of expandable gripping means 38.

Said stem 30 extends from a shaped body 26 positioned beneath the shelf or base 12 or above the top 13.

The shaped body 26 contains a pinion-toothed crown bevel gear. As in the previous case, the pinion 28 is rotatably positioned within the shaped body 26 and provides an actuation seat 29 facing the front part of the furniture M. The pinion 28 engages with the above-mentioned toothed crown 39, formed as the head of the shaped stem 30.

As for the first example shown and described, an extension 25 of the shaped body 26 of an actuation and blocking group of the joint forming part of the system of the present invention, is housed in a hole having an enlarged diameter 24 formed in the lower surface of the shelf or base facing the floor P.

A tool 57, when inserted in the actuation seat 29 of the pinion 28 and rotated, controls the rotation of the toothed crown 39 integral with the shaped stem 30 with the consequent activation of the actuation mechanism of expandable gripping means 38. The expandable gripping means 38 had been previously inserted in the bush 15 bringing the base 12 into contact with the shoulder 11.

FIGS. 11 to 20 show in various views and in its parts, a further embodiment of an actuation and blocking group 27 of a joint G forming part of the system of the present invention with the pinion and toothed crown for controlling the rotation of the shaped stem 30.

The same reference numbers are provided hereunder for the same elements.

In particular, it can be noted how the shaped body 26 and its extension 25 of the previous example are produced as forming part of two half-shells 25',26' and 25",26". When juxtaposed, they form a shaped body identical to the previous one, also forming part of an actuation and blocking group 27 of the joint G forming part of the system of the present invention.

It can therefore be seen in the various figures of this embodiment how a pinion 28, rotatable inside the shaped body 26',26", and a pinion that provides a seat 29 in the actuation point A facing the front part of the furniture M, are arranged in this body in two half-shells 25',26' and 25",26". Also in this case, the pinion 28 engages with a toothed crown 39, formed as the head of the shaped stem 30 which extends towards the outside of the group. Said shaped stem 30, having a hexagonal section for example, is provided for being engaged inside an element of the joint G in a hole 31 or, as already shown, in a hole 31 of a blocking grub screw 19, identically shaped. The figures show how the two half-shells 25',26' and 25",26" are fixed to each other by means, for example, of rivets 40 or screws or similar reciprocal constraining elements.

FIGS. 21 to 30 show, in various views and in its parts, yet another embodiment of an actuation and blocking group 27 of a joint G forming part of the system of the present invention with a worm screw and gearwheel for controlling the rotation of the shaped stem 30.

This further embodiment, wherein the same reference numbers are provided for the same elements, shows a shaped body 26 and an extension 25 as in the previous case.

A gearwheel 41, arranged according to a first vertical axis X in the figures, is housed in the body 26, which extends upwards into a grooved ring 42 and which ends with a shaped stem 30 which extends towards the outside of the group. Said shaped stem 30, having a hexagonal section for example, is provided for being engaged inside an element of the joint G in a hole 31 or, as already shown, in a hole 31 of a blocking grub screw 19, identically shaped.

A worm screw 43, arranged according to a horizontal axis Y in the figures, is coupled with said gearwheel 41 for controlling the rotation of the shaped stem 30.

Both the worm screw 43 and the gearwheel 41 are therefore housed in the holes 44, 45 of the shaped body 26, wherein the axes X, Y of the holes 45, 44 are arranged at 90° with respect to each other. The gearwheel 41 is blocked in position thanks to the presence of a plug 46 which is inserted in the grooved ring 42 passing into a pair of holes 47 formed in the extension 25 of the body 26. A second plug 48, passing into a hole 49 of the body 26, is inserted in a groove 52 of the worm screw 43 so as to allow its rotation inside the hole 44 of the body 26, but not its displacement. It can also be seen how the worm screw 43 has a shaped seat 53 for receiving the end of an actuation tool 57 for rotation.

Its functioning is completely intuitive and is not described in detail as it is clearly illustrated in the figures.

It can be noted from the examples described and illustrated how, with an actuation and blocking system of a joint between a shoulder and a shelf of pieces of furniture or other furnishing items according to the invention, an actuation and blocking group 27 of the joint G forming part of the system according to the invention is provided, fixed on a lower horizontal surface of a shelf, or base 12, or on the upper surface of a top 13 facing downwards (or upwards) and forming part of the furniture M together with at least one shoulder 11.

Said actuation and blocking group 27 of the joint G is arranged in correspondence with the pin 17 of the joint for actuating and blocking the joint for a 90° transmission of the maneuvering point.

In particular, with a group of this type, an actuation and blocking system of a joint is produced between a shoulder and a shelf of pieces of furniture or other furnishing items which can also be used at maneuvering or blocking points of joints of the known art.

All joints must in fact have a maneuvering or blocking point regardless of the mechanism inside the pin, when present, said mechanism however not being an object of the present patent.

It can thus be seen how a system according to the invention is extremely simple and functional.

Furthermore, thus system with front actuation can be positioned in extremely minimal spaces between furniture and floor or ceiling.

It can also be noted that with this system no visible holings are provided as maneuvering points are used in front of the various groups.

Furthermore, as shown for example in FIGS. 2 and 3, actuation rods 50 are provided for the rear joints of the furniture M, which are positioned between front supports 51 and each actuation and blocking group 27 of the joint G associated with the rear joints. The rear joints G can provide identical pins to those of the front joints, by arranging the actuation rods 50 tilted between the support 51 and the actuation and blocking group 27 of the joint G (FIG. 3).

In an alternative solution, the rear joints G can provide longer pins with respect to those of the front joints by arranging the actuation rods 50 upright between the support 51 and the actuation and blocking group 27 of the joint G (FIG. 2). The rest of the system of the present invention is completely identical to that previously described in its embodiments.

In both of the examples shown in FIGS. 2 and 3, the actuation rods 50 are always actuated with a tool 58 from the front part of the furniture M.

FIG. 31 shows a further example of a system according to the invention wherein the front and rear joints G can also have a side actuation after rotating the actuation and blocking group 27 of the joint G and having a maneuvering point A which is accessible from the side of the furniture M with a tool 57 of the type previously indicated.

In this arrangement, the actuation and blocking group 27 of the joint G must be directed so as to provide that the actuation seat 29 of the pinion-toothed crown bevel gear or the seat 53 of the gearwheel-worm screw pair or other actuation mechanism is facing the side part of the furniture M.

The forms and structure for producing a system according to the present invention, as also the materials and assembly modes, can obviously differ from those shown for non-limiting illustrative purposes in the drawings.

The objectives mentioned in the preamble of the description have therefore been achieved.

The protection scope of the present invention is defined by the enclosed claims.

The invention claimed is:

1. An actuation and blocking system of a joint of a piece of furniture or other furnishing item having a shoulder and a shelf, base, or top to be positioned for stably interconnecting, with a joint, said shoulder and said shelf, base, or top arranged perpendicular to each other, said joint comprising:
   a pin equipped with fixing elements to said shoulder and said shelf, base, or top and at least partially inserted in a hole of the shoulder and of the shelf, base, or top,
   wherein said pin has a side hole configured to receive a grub screw, which extends from an actuation and blocking group of the joint positioned on said shelf, base, or top parallel to a floor or a ceiling, said actuation and blocking group of the joint providing a 90° transmission between an actuation point, which is accessible from a front or a side of the piece of furniture or other furnishing item, and said grub screw, which is inserted in said side hole of said pin,
   wherein said pin engages said shoulder and has a protruding portion that provides a housing for a tip of said grub screw, which is screwed into an internal threaded hole of a barrel positioned in a first hole of the shelf, base, or top, wherein said first hole crosses and intersects a second hole formed in a direction perpendicular to the first hole of the shelf, base, or top, said second hole receiving the pin, wherein said grub screw includes a polygonal hole, which receives a polygonal stem that extends from said actuation and blocking group of the joint, and wherein said actuation and blocking group of the joint comprises a shaped body, which contains a pinion-toothed crown bevel gear for controlling a rotation of said polygonal stem, said shaped body having a lower base having a first diameter, the lower base having an upper face that abuts against the shelf, base, or top, and further having an upright portion, having a second diameter smaller than the first diameter, extending from the upper face into the first hole.

2. The actuation and blocking system of a joint according to claim 1, wherein said pinion-toothed crown bevel gear of said shaped body comprises a pinion, which is rotatingly positioned inside said shaped body and comprises a seat arranged in the actuation point facing the front or side of the piece of furniture or other furnishing item, a toothed crown also being provided, which engages said pinion and which is formed as a head of the polygonal stem, which extends towards an outside of the actuation and blocking group.

3. The actuation and blocking system of a joint according to claim 1, wherein said shaped body that houses said pinion-toothed crown bevel gear is composed of two half shells.

4. The actuation and blocking system of a joint according to claim 3, wherein said two half shells comprise two extensions and are fixed to each other.

\* \* \* \* \*